(No Model.)
C. E. McCLURE.
METHOD OF PRESERVING EGGS.
No. 504,535. Patented Sept. 5, 1893.
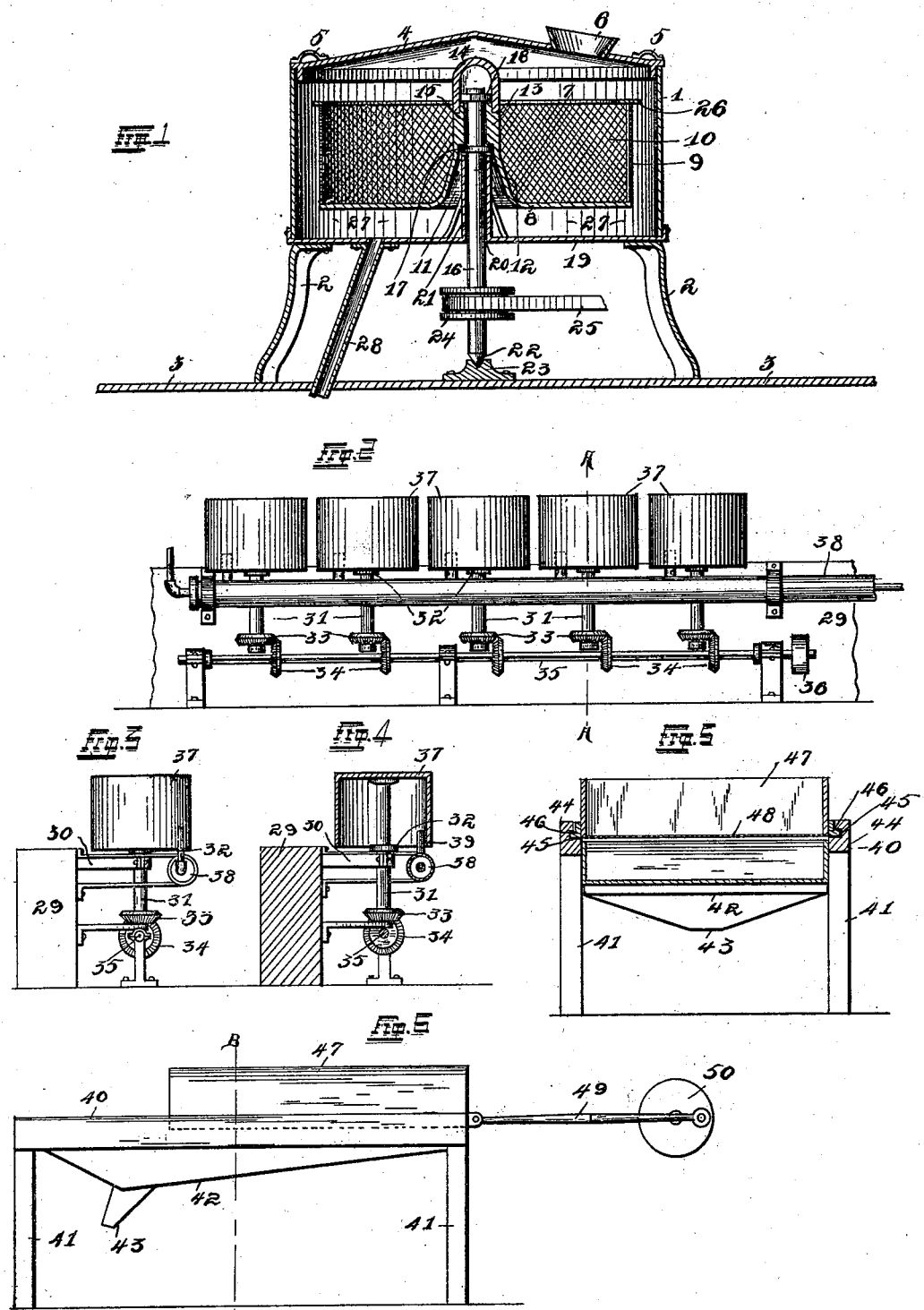
Witnesses
Alfred O. Eicher
Herbert V. Robinson
Inventor
Charles E. McClure,
By his Attorneys Higdon & Higdon Longan

UNITED STATES PATENT OFFICE.

CHARLES E. McCLURE, OF ST. LOUIS, MISSOURI.

METHOD OF PRESERVING EGGS.

SPECIFICATION forming part of Letters Patent No. 504,535, dated September 5, 1893.

Application filed November 29, 1892. Serial No. 453,515. (No specimens.)

*To all whom it may concern:*

Be it known that I, CHARLES E. MCCLURE, of the city of St. Louis and State of Missouri, have invented certain new and useful Improvements in Methods of Preparing Eggs for Commercial Use, of which the following is a full, clear, and exact description, reference being had to the accompanying drawings, forming a part hereof.

My invention relates to methods of preparing eggs for commercial use, and consists specifically in the various steps through which the egg passes from the raw state to the dried and powdered product ready for use. Former methods of preparing eggs for storage, by disintegration and drying, have all failed to retain in the product obtained the full nutrition and flavor of the fresh egg. Common prejudice against innovations of this kind has deteriorated the development of the art, but it is believed that the product will be found satisfactory, containing all the elements of the raw egg, as has been fully demonstrated by practical experiments.

In the drawings:—I have illustrated an apparatus for carrying out my present invention, of which:—

Figure 1 is a longitudinal vertical section of the disintegrator, performing the first step of the process. Fig. 2 is a side elevation of the revolving drying plates used to carry out the second step of the operation. Fig. 3 is an end elevation of the construction shown in Fig. 2. Fig. 4 is a vertical cross-section taken on a line A—A in Fig. 2. Fig. 5 is a transverse section taken on a line B—B in Fig. 6. Fig. 6 is a side elevation of the device used to disintegrate the dried material and perform the third step in the process.

Referring to the drawings: I will first describe the separator used to carry out the first step of the method of preparing eggs for commercial use. 1 indicates a circular casing or shell supported by standards 2 above the floor 3 in the second story of a building. The casing 1 is provided with a hood 4 having handles 5 to facilitate its removal and a hopper 6 through which the eggs are thrown into the interior of the disintegrator. Adapted to revolve within the casing 1 is a circular basket 7 having an imperforate bottom 8. The basket 7 consists of an exterior perforated copper shell 9 lined upon the inner side with a gauze netting 10 made of steel or some equally non-corrosive and firm material. The bottom 8 is provided in its center with a conical portion 11 having upwardly and inwardly converging walls 12. The walls 12 are surmounted by a circular sleeve 13 which has a removable cap 14. The sleeve 13 is provided with an interiorly screw-threaded vertical opening 15 into which is secured the upper end of a vertical shaft 16. A flange 17 upon the shaft 16 rests immediately under and adjacent the sleeve 13 and a jam nut 18 is screwed down upon the shaft against the upper end of the sleeve 13, thus making the centrifugal basket 7 revoluble with said shaft 16. The bottom 19 of the casing 1 is provided with a circular opening 20 having an upwardly projecting tubular portion 21 surrounding its periphery and which forms a vertical bearing for the shaft 16, the upper end of said portion 21 being immediately under and adjacent the flange 17. The lower end 22 of the shaft 16 is conical in form and has a bearing in a block 23 having a cavity to receive the end 22 of the shaft 16, and in which the same revolves. Intermediate of the bottom 19 of the casing 1 and the floor 3, upon the shaft 16 is located a horizontal pulley 24 having a belt 25 leading therefrom to the source of power. The revolving of the shaft 16 therefore revolves the basket 7. The upwardly extending peripheral portion 12 and the sleeve 13 with its cap 14 forms what may be termed sloping sides for the center of the basket 7, the tendency of same being to throw the material out toward the wire screen 10 and the perforated copper shell 9. The basket 7 is surmounted by a peripheral rim 26 which prevents the overflowing of the material from the basket. By reference particularly to Fig. 1 it will be seen that a chamber 27 is formed between the shell 9 and casing 1 and between the bottom 8 of the basket 7 and the bottom 19 of the casing. A pipe 28 leads downwardly from the bottom 19 of the casing 1 through the floor 3 into the room below the one wherein the disintegrator is located, and should be provided near its lower end with a valve to control the flow of material. It will be seen from the above description that the disintegration of the egg meat and the separation of the shells therefrom, takes place simultaneously, as the shells remain within the basket 7 and are removed therefrom at different intervals.

The second step in the method consists in eliminating the moisture from the disintegrated material and to do this I have provided a series of revolving heated shells upon which the material is placed. A wall 29 built upon the floor has a number of projecting arms 30 providing bearings for vertical shafts 31 which are provided with flanges 32 to prevent the vertical movement of said shafts 31. The lower ends of the shafts 31 are provided with pinions 33 which mesh into pinions 34 located upon a horizontal shaft 35 which is driven by a belt upon the pulley 36. Each of said vertical shafts 31 are surmounted by a cylindrical hood or shell 37 which is open at the bottom. The shells are made of some non-corrosive material which will not affect the disintegrated egg, and are adapted to revolve with said shaft 31. A longitudinal hot air cylinder 38 is located in alignment below the shells 37 and adjacent to the inner periphery of same. The hot-air cylinder has pipes 39 leading up into each of said shells 37, so that in rotating, said shells are equally heated by the heat emanating from said pipes 39. The hot air cylinder 38 is heated by hot-air blown into same by fans, from the engine exhaust, and is further heated by a steam pipe which runs longitudinally within the same, and in which live steam is injected. The disintegrated material is poured upon the heated shells 37 and is dried by the heat, all moisture being eliminated. The heat necessary, varies from 140° to 160° Fahrenheit.

The third step of the method consists in further disintegrating the material after the moisture has been eliminated. The necessary machinery consists of a trough 40 supported by standards 41, and having a sloping bottom 42 terminating in a spout 43. The sides 44 of said trough are provided with rectangular grooves 45 into which fit and operate rectangular guides 46 upon the lower sides of a screening box 47 having a reticulated bottom 48. The forward end of the box 47 is connected by a rod 49 with a crank 50, the revolving of which imparts to the screening box 47, a longitudinal movement which thoroughly shakes up the dried material after being taken from the revolving shells 37, and screens it through the reticulated bottom 48, the size of the openings in same determining the size of the particles of the product. The dried product is taken off through the spout 43 into cases for handling or shipment as is desired.

Included in the first step of the method, is a thorough mixing with the material of a preserving compound. This compound consists of a combination of sugar and salt, or of either of said materials alone, as well as other mixtures which need not be herein named. The eggs before thrown into the hopper 6 may be broken up if desired, or may be thrown in and broken by the force of the revolving basket.

Having fully described the mechanisms used in carrying out the method of preparing eggs for commercial use, I will now further detail the steps. If no other safeguard against the introduction of unsuitable eggs is taken, the same are broken up before being thrown into the hopper. The preserving compound, preferably salt, is introduced into the revolving basket together with the eggs, and the entire material is thrown by centrifugal impulse against the wire screening and perforated shell. The shells do not pass through the screen, owing to their consistency and lightness of weight, and therefore the matter which passes downwardly through the pipe 28 is the meat of the egg thoroughly shredded and mixed with the preserving compound.

The next step includes the elimination of all moisture from the egg in its disintegrated state and this is done by transferring the same from the pipe 28 and slowly covering the revolving shells 37, which being heated dry the material and it is now in a state to be removed and again disintegrated. After being scraped off of the heated shells 37 into suitable receptacles, the material is ready for the third step of the method which consists in screening the dry material to a desired fineness by the rapid shaking up of same in the screening box having the longitudinally reciprocatory movement.

Having fully described the steps necessary in preparing eggs for commercial use, what I claim is—

1. The herein described method of preparing eggs for commercial use, consisting first in the simultaneous disintegration of the egg and the separating of the shells therefrom, secondly the collecting of the disintegrating material and the drying of same upon revolving driers heated to 160° Fahrenheit, and thirdly the disintegration or pulverizing of the dried material, substantially as set forth.

2. The herein described method of preparing eggs for commercial use, consisting first in the disintegration of the egg meat, the separation of shells therefrom and the thorough mixing of said disintegrated material with a preserving compound, second the collection of said disintegrated and mixed egg meat and preservative and the drying of same upon revolving driers and third the removal of the dried mixture and the disintegration of same ready for use, substantially as set forth.

3. The herein described method of preparing eggs for commercial use, by first disintegrating the egg meat, separating the shells therefrom, and the mixing of said disintegrated meat with a preservative, all of said steps consummated simultaneously by centrifugal force, substantially as set forth.

In testimony whereof I affix my signature in presence of two witnesses.

CHARLES E. McCLURE.

Witnesses:
 HERBERT S. ROBINSON,
 ALFRED A. EICKS.